United States Patent
Imamura et al.

(10) Patent No.: US 6,753,099 B2
(45) Date of Patent: Jun. 22, 2004

(54) PHOSPHOR AND IMAGING DEVICE USING THE SAME

(75) Inventors: Shin Imamura, Kokubunji (JP); Masatoshi Shiiki, Musashimurayama (JP); Masaaki Komatsu, Kokubunji (JP); Hidetsugu Matsukiyo, Mobara (JP); Yoshihiro Koseki, Chiba (JP); Takashi Hase, Ebina (JP); Tsutomu Yamada, Minamiashigara (JP)

(73) Assignees: Hitachi, Ltd., Tokyo (JP); Hitachi Device Engineering Co., Ltd., Mobara (JP); Kasei Optonix, Ltd., Odawara (JP)

( * ) Notice: Subject to any disclaimer, the term of this patent is extended or adjusted under 35 U.S.C. 154(b) by 0 days.

(21) Appl. No.: 10/180,128

(22) Filed: Jun. 27, 2002

(65) Prior Publication Data

US 2003/0094889 A1 May 22, 2003

(30) Foreign Application Priority Data

Nov. 20, 2001 (JP) ........................................ 2001-354822

(51) Int. Cl.$^7$ ........................ H05B 33/14; C09K 11/00
(52) U.S. Cl. ...................... 428/690; 428/446; 428/697; 428/702; 428/704; 313/467; 313/468; 313/309; 313/336; 313/495; 313/582; 252/301.4 R; 252/301.4 F; 423/263; 423/618; 423/624
(58) Field of Search .................... 313/467–468, 313/309, 336, 582; 252/301.4 R, 301.4 F; 428/690, 446, 697, 702, 704; 423/263, 618, 624

(56) References Cited

U.S. PATENT DOCUMENTS

| | | | | |
|---|---|---|---|---|
| 4,924,139 A | * | 5/1990 | Morita et al. | 313/468 |
| 5,177,401 A | * | 1/1993 | Matsukiyo et al. | 313/468 |
| 2001/0009060 A1 | * | 7/2001 | Browning et al. | 29/458 |
| 2001/0011869 A1 | * | 8/2001 | Nakajima et al. | 313/586 |

FOREIGN PATENT DOCUMENTS

| | | |
|---|---|---|
| JP | 61-21505 | 1/1986 |
| JP | 6-62939 | 11/1987 |
| JP | 2-289679 | 11/1990 |
| JP | 6-60354 | 8/1994 |

* cited by examiner

Primary Examiner—Deborah Jones
Assistant Examiner—Ling Xu
(74) Attorney, Agent, or Firm—Antonelli, Terry, Stout & Kraus, LLP

(57) ABSTRACT

The present invention provides a green emitting phosphor which includes an excess of the ordinary $SiO_2$ component included in parent material $Y_{2-2x}SiO_5$ activated by Tb in terms of stoichiometric ratio. The composition of the above phosphor is represented by chemical formula:

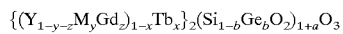

$$\{(Y_{1-y-z}M_yGd_z)_{1-x}Tb_x\}_2(Si_{1-b}Ge_bO_2)_{1+a}O_3$$

where values of x, y, z, a, and b are assigned, subject to $0<x\leq 1$, $0\leq y\leq 1$, $0\leq z\leq 1$, $0<a\leq 1$, and $0\leq b\leq 1$, and M is at least one element selected from a group comprising Sc, In, La, Lu, Yb, Ce, Eu, Sm, Tm, Ho, Er, and Nd. By using this phosphor, phosphors that emit light of higher luminance with less luminance degradation and are suitable for high-quality image display and imaging devices producing high-quality images are obtained.

19 Claims, 7 Drawing Sheets

PHOSPHOR AND IMAGING DEVICE USING THE SAME

BACKGROUND OF THE INVENTION

The present invention relates to phosphors and imaging devices such as projection-type cathode ray tubes and display panels using the phosphors. More particularly, the invention relates to green emitting phosphors that emit high-luminance light with less luminance degradation and are suitable for image display and imaging devices such as projection-type cathode ray tubes and image display panels using such phosphors.

In recent years, imaging devices using cathode ray tubes for displaying color images have made advances toward higher solution and luminance to meet the need of higher performance. The imaging devices discussed herein are those for imaging from image data through light emission in such a way that phosphors are excited by irradiation of electron beams or ultraviolet rays; namely, cathode ray tubes (especially, projection-type cathode ray tubes), display panels using low energy electron beams, such as a field-emitter display (FED), and plasma display panels (PDP). The imaging devices include a system for imaging from image data which incorporates a drive for driving any tube or panel mentioned above, image data processing circuitry, and the like.

Higher solution and luminance of these imaging devices have been achieved by reducing the diameter of an excitation spot of electron beams or the like, increasing the scan speed, and increasing the excitation intensity. However, this is accompanied by the following drawbacks: luminance saturation of phosphors used in the imaging device, luminance degradation, and significant afterimages due to afterglow, resulting in a decline in image quality as a problem. At the same time, better color reproduction quality is required. Therefore, phosphors must satisfy requirements of luminance saturation, degradation, and afterglow properties and color enhancement.

Using a projection-type cathode ray tubes (hereinafter referred to as a projection tube) typical of the imaging devices as an example, its problems will be explained below. For the cathode ray tube, its luminance intensity is controlled by regulating the current of excited electron beams. Thus, it is required that the luminance of phosphors linearly increases in proportion to the current. However, generally, as the excitation intensity becomes high, luminance saturation takes place, that is, the luminance runs off the linear. When an image is displayed with highly intense excitation, phosphor materials are damaged. Consequently, luminance decreases and color emission degrades during continued use of the projection tube.

The projection tube is a cathode ray tube for use in a projection-type display and projects an image generated by the cathode ray tube on a screen through the optics that enlarge the image area by several tens of times. Thus, excitation is performed by current of 10 to 100 times as much as a generally used direct-viewing cathode ray tube producing non-enlarged images.

Accordingly, requirements for phosphors for the projection tube are less luminance saturation especially when the tube carries a large quantity of current and less degradation when the tube carries a large quantity of current. Among the phosphors used for emission of three primary colors R (read), B (green), and B (blue), especially for green emitting phosphors which generate 70% of luminance in a white light, the above improvements of phosphor properties are important.

Varieties of materials have so far been used for green emitting phosphors for the cathode ray tube. For example, a phosphor composition expressed by chemical formula $Y_2SiO_5:Tb$ is known. The feature of this phosphor composition is less luminance saturation when excited with high-density current and it has been generally used as a practical phosphor. However, such a problem with this phosphor composition has been posed that a decline in coloring and color emission efficiency occurs by irradiation of electron beams and luminance degrades as irradiation continues. Another problem thereof is insufficient luminance of light it generates.

To solve these problems, luminance improvement was attempted by replacing a part of the composition with Sc as disclosed in, for example, Japanese Examined Patent Publication No. Sho 61-21505 and Japanese Examined Patent Publication No. Hei 6-62939.

Furthermore, as disclosed in, for example, Japanese Laid-Open No. Hei 2-289679, improvement to luminance and suppressing luminance degradation were attempted by replacing a part of the composition with any one of the substances Gd, Tm, Sm, and Eu.

Furthermore, as disclosed in, for example, the above-mentioned Japanese Examined Patent Publication No. Sho 61-21505, luminance improvement was attempted by replacing a part of the composition with Mu.

Furthermore, as disclosed in, for example, Japanese Examined Patent Publication No. Hei 6-60354, luminance improvement was attempted by replacing a part of the composition with Dy or Pr.

Even these improved phosphors, however, are not enough to satisfy the requirements of recent cathode ray tubes carrying a large quantity of current to provide higher solution and luminance degradation is still a problem. Improvement to luminance is constantly required.

Luminance degradation to a great degree was regarded as a drawback of the above-mentioned conventional phosphor composition $Y_2SiO_5:Tb$.

SUMMARY OF THE INVENTION

The object of the present invention is to provide phosphors to emit high-luminance light with less luminance degradation and provide an imaging device producing good-quality images using such phosphors.

The above object can be achieved by synthesizing a phosphor that is specified below in chemical composition.

In one aspect, the invention provides a green emitting phosphor whose composition is expressed by chemical formula:

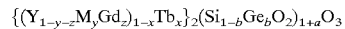

where values of x, y, z, a, and b are assigned, subject to $0<x\leq 0.5$, $0\leq y\leq 1$, $0\leq z\leq 1$ (where $0<y+z\leq 1$), $0<a\leq 1$, and $0\leq b\leq 1$, and M is at least one element (rare earth) to be selected from a group of Sc, In, La, Lu, Yb, Ce, Eu, Sm, Tm, Ho, Er, and Nd.

Green emitting phosphors synthesized by prior art are those obtained by replacing a part of component Y of parent material $Y_{2-2x}SiO_5$ activated by $Tb_x$ with Gd, Sc, Yb, Eu, Sm, Tm, Mn, Dy, Pr, or the like.

In contrast, the first phosphor of the present invention is a green emitting phosphor that has composition including an excess of $SiO_2$ in terms of stoichiometric ratio ($0<a\leq 1$), wherein Y is replaced with Gd, its fundamental composition being expressed by chemical formula:

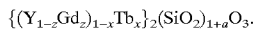

The second phosphor of the present invention is a green emitting phosphor that has composition including an excess of $SiO_2$ in terms of stoichiometric ratio ($0<a\leq 1$), wherein Y is replaced with at least one element (rare earth) of the following: Sc, In, La, Lu, Yb, Ce, Eu, Sm Tm, Ho, Er, and Nd, its fundamental composition being expressed by chemical formula:

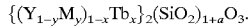

The third phosphor of the present invention is a green emitting phosphor that has composition including an excess of $SiO_2$ in terms of stoichiometric ratio ($0<a\leq 1$), wherein Y is replaced with Gd and at least one element of the following: Sc, In, La, Lu, Yb, Ce, Eu, Sm Tm, Ho, Er, and Nd, its fundamental composition being expressed by chemical formula:

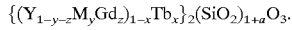

The fourth phosphor of the present invention is a green emitting phosphor derived from the foregoing three phosphor compositions wherein a part or all of Si is replaced with Ge, its fundamental composition being expressed by chemical formula:

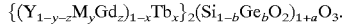

In accordance with the present invention described above, phosphors can be obtained that emit higher luminance light with less luminance degradation than those obtained by prior art.

For a phosphor obtained, according to the above-mentioned Japanese Laid-Open No. Hei 2-289679, which is an example of prior art, its result data showed that the luminance of its light emission reaches the maximum around $z=0.2$, where z is Gd replacement quantity. The luminance of light emission by the phosphors of present invention reaches the maximum at lower concentration of Gd ($0\leq z\leq 0.1$). This is because Gd replacement of less quantity is effective for generating high-luminance light in the phosphor synthesis method of the present invention.

The phosphor synthesis method according to the present invention includes a process in which reaction takes place at high temperature without using flux, which will be detailed in the later section of the preferred embodiments, and Y oxide material including Gd is used as a material of phosphor composition. This process can enhance the effect of the present invention.

For phosphors obtained by replacing a part of Si with Mn, Dy, or Pr, according to the above-mentioned Japanese Examined Patent Publication No. Sho 61-21505 and No. Hei 6-60354, which are also examples of prior art, the initial luminance of their light emission is improved, but more luminance degradation may occur as they continues to emit light. On the other hand, the properties of the phosphors obtained by the present invention are improved with regard to luminance degradation as well.

The phosphors of the present invention are obtained in unrestricted form; they may be either a single crystal or polycrystal. They may be obtained in any form such as sintered solids or powders. However, powders resulting from reaction at high temperature are often used for light emission by electron excitation in cathode ray tubes or the like. For this application, powders with a particle diameter of 1 $\mu$m to 20 $\mu$m are used.

In another aspect of the invention, a phosphor of the present invention is mixed with another phosphor with different composition into a phosphor mixture. Particularly, it is mixed with at least one phosphor selected from a group comprising $Y_3(Al, Ga)_5O_{12}$:Tb, $Zn_2SiO_4$:Mn, LaOCl:Tb, and $InBO_3$: Tb. The resultant phosphor mixture can emit higher luminance light or provide better color reproduction quality.

As concerns practical usage of phosphors obtained by the present invention, by applying a phosphor layer comprising the phosphors of the present invention to an imaging device, the invention can provide an imaging device producing good-quality images. This will be explained, using a projection-type display as an example. The projection-type display is made up of three projection tubes that are for discrete R, B, and G colors. As phosphors that are deposited to the face plate of the green projection tube, it is advisable to use phosphors of a single type of the invention or above-described green phosphor mixtures including any type of phosphors of the invention. Thereby, an imaging device featuring a longer life span can be made.

The phosphors obtained by the prevent invention are also used in cathode ray tubes for direct-viewing display (hereinafter referred to as direct-viewing tubes). As green-emitting phosphors of the phosphors of three primary colors to be applied to a face plate, it is advisable to use phosphors of a single type in accordance with the invention or above-described mixtures of any type of phosphors in accordance with the invention and another kind of green-emitting phosphors. Thereby, an imaging device featuring fine green emission color, a longer life span, shorter afterglow, and good image quality can be made.

It is also advisable to apply a phosphor layer comprising the phosphors of the present invention to an imaging device using low energy electron beams, such as a field-emitter display (abbreviated to FED). Thereby, an imaging device featuring a longer life space can be made.

The phosphors obtained by the present invention have excellent properties especially with regard to luminance degradation when being excited by large current and luminance saturation. Thus, they are most suitable for use in projection tubes and FED.

Furthermore, it is advisable to apply a phosphor layer comprising the phosphors of the present invention to an imaging device in which light emission is performed through excitation of the phosphors by ultraviolet radiation, such as a plasma display panel (PDP). Thereby, an imaging device featuring a longer life span can be made.

DESCRIPTION OF THE PREFERRED EMBODIMENTS

Preferred embodiments of the present invention will now be described in detail, using the accompanying drawings.

<Embodiment 1>

We prepared phosphors in accordance with the present invention in a method as will be described below and evaluated the properties thereof.

(1) Method of preparing phosphors

As materials, $(Y, Tb)_2O_3$, $SiO_2$, and a Gd oxide were used. Alternatively, $(Y, Tb, Gd)_2O_3$ and $SiO_2$ were used. These materials of predetermined quantities were well mixed. The resultant mixture was put in an alumina crucible. After shutting the lid of the crucible, the mixture was burned for two hours in a reducing atmosphere at 1550° C. The solid resulting from the burning was crashed and broken into phosphor powders with a particle diameter of about 6 μm.

In this method, phosphors having composition expressed by chemical formula $\{(Y_{1-z}Gd_z)_{1-x}Tb_x\}_2(SiO_2)_{1+a}O_3$ were prepared, wherein the composition was altered by varying the value of x in the range of $0.03 \leq x \leq 0.15$, the value of z in the range of $0 \leq x \leq 1$, and the value of a in the range of $0 \leq a \leq 1$. Thus, phosphor samples of different proportions of components were prepared.

Conventional phosphor samples for which x=0.07, z=0, and a=0 were also prepared for comparison with the phosphor samples of the present invention. In conventional phosphors for practical use, generally, x= about 0.07.

(2) Method of Evaluating Light Emission Properties

To measure the light emission properties of cathode ray tubes using the above phosphor samples, the thus obtained phosphor samples were settled by sedimentation on a copper substrate and a phosphor layer having weight of about 5 mg/cm² was obtained. This phosphor layer was placed in a vacuum of $7 \times 10^{-6}$ Pa or more and irradiated with electron beams whose current density varies in the range of 0.1 to 1250 μA/cm². Luminance and luminance degradation were measured.

Luminance was measured by a photo transistor made of Si at a distance of 20 cm from the layer surface.

Luminance degradation was evaluated by an accelerated degradation test. That is, the phosphor sample temperature was increased to 20° C. and the phosphor layer was irradiated with electron beams of current density several tens of times (1250 μA/cm²) as much as that applied normally for 1 practical use for 30 minutes. After the phosphor layer was left without being irradiated for 30 minutes to be allowed to cool to its initial temperature, the luminance of its light emission was measured. A ratio of degraded luminance to the initial luminance was determined and defined as a maintenance factor of luminance that was used as a criterion of evaluating luminance degradation. The higher maintenance factor of luminance indicates the less luminance degradation of the phosphor tested.

The results of the measurements with regard to the maintenance factor of luminance and luminance (relative luminance) are shown in FIGS. 1 to 4.

Figure 1:
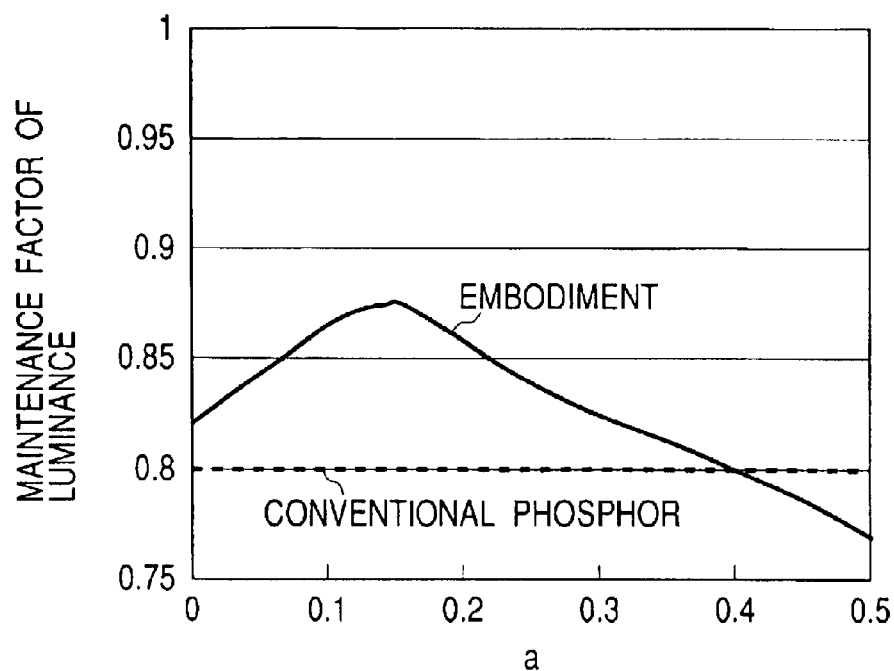
FIG. 1 shows a characteristic curve representing excess $SiO_2$ concentration (a) versus a maintenance factor of luminance regarding phosphors according to a first embodiment of the present invention.

FIG. 1 shows how the maintenance factor of luminance of the phosphor samples of the invention after the accelerated degradation test, measured by the above-described method, changed as the value of a representing the quantity of extra $SiO_2$ was varied from 0 to 1 with x=0.07 and z=0.05. The graph plotted is for a=0.5 and less. The same factor of conventional phosphor samples is also plotted (assuming that x=0.07, a=0, and z=0 for the conventional ones). As apparent from FIG. 1, the maintenance factor of luminance of the phosphor samples of the invention is higher than that of conventional ones in the range of $0 < a \leq 0.4$. Especially, around a=0.13, it is shown that this factor increased about 8% by the invention.

The measurements of other phosphor samples with different proportions of the components, wherein the value of x varies in the range of $0.03 \leq x \leq 0.15$ and the value of z varies in the range of $0 \leq z \leq 1$, showed the same results as shown in FIG. 1 of Embodiment 1 when the value of a was varied similarly.

Figure 2:
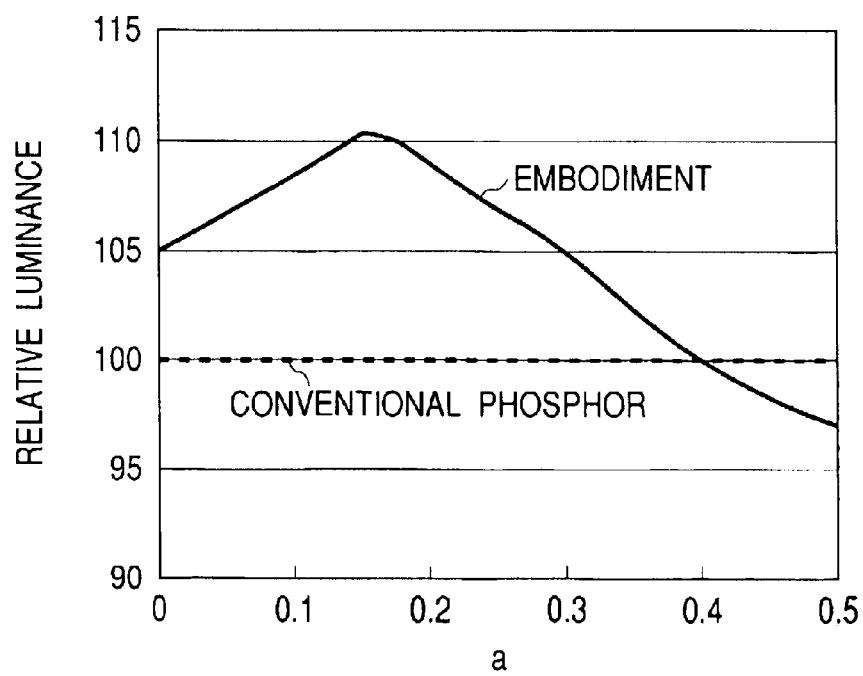
FIG. 2 shows a characteristic curve representing excess $SiO_2$ concentration (a) versus relative luminance regarding the phosphors of the first embodiment of the invention.

FIG. 2 shows how the relative luminance of light emission by the phosphor samples of the invention changed as the value of a was varied from 0 to 1 similarly, wherein the luminance of conventional phosphor samples is assumed to be 100 (assuming that x=0.07, a=0, and z=0 for the conventional ones). The graph plotted is for a=0.5 and less. As apparent from FIG. 2, the luminance of the phosphor samples of the invention is higher than that of conventional ones in the range of $0 < a \leq 0.4$. Especially, around a=0.13, it is shown that luminance increased about 10% by the invention.

The measurements of other phosphor samples with different proportions of the components, wherein the value of x varies in the range of $0.03 \leq x \leq 0.15$ and the value of z varies in the range of $0 \leq z \leq 1$, showed the same results as shown in FIG. 2 of Embodiment 1 when the value of a was varied similarly.

Figure 3:
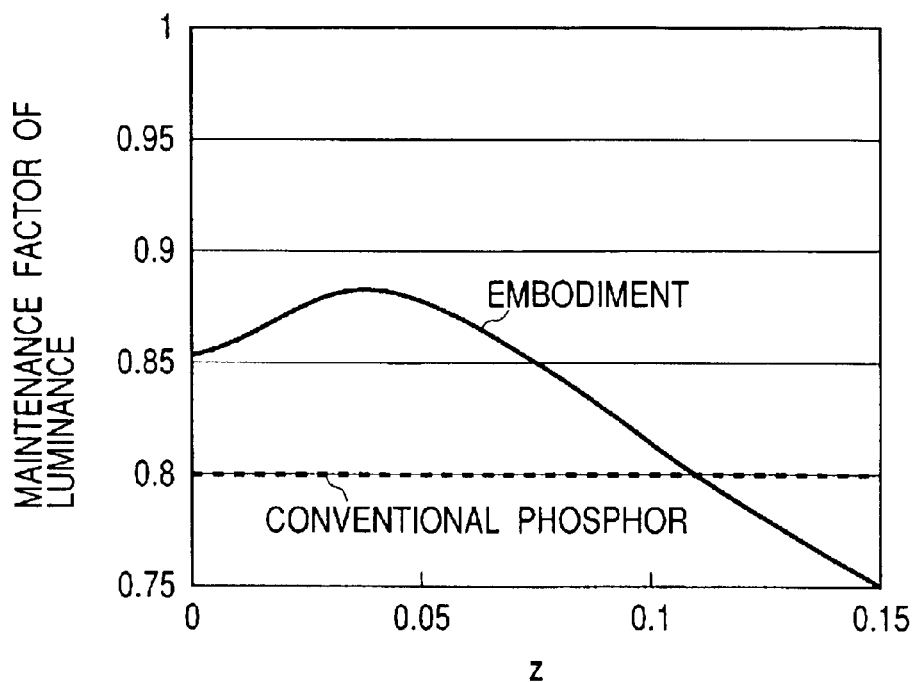
FIG. 3 shows a characteristic curve representing Gd concentration (x) versus the maintenance factor of luminance regarding the phosphors of the first embodiment of the invention.

FIG. 3 shows how the maintenance factor of luminance of the phosphor samples of the invention, measured by the above-described method after the accelerated degradation test, changed as the value of z was varied from 0 to 1 with x=0.07 and a=0.05. The graph plotted is for z=0.15 and less. The same factor of conventional phosphor samples is also plotted (assuming that x=0.07, a=0, and z=0 for the conventional ones). As apparent from FIG. 3, the maintenance factor of luminance of the phosphor samples of the invention is higher than that of conventional ones in the range of $0 < z \leq 0.12$. Especially, around z=0.05, it is shown that this factor increased about 8% by the invention.

The measurements of other phosphor samples with different proportions of the components, wherein the value of x varies in the range of $0.03 \leq x \leq 0.15$ and the value of a varies in the range of $0 \leq a \leq 1$, showed the same results as shown in FIG. 3 of Embodiment 1 when the value of z was varied similarly.

Figure 4:
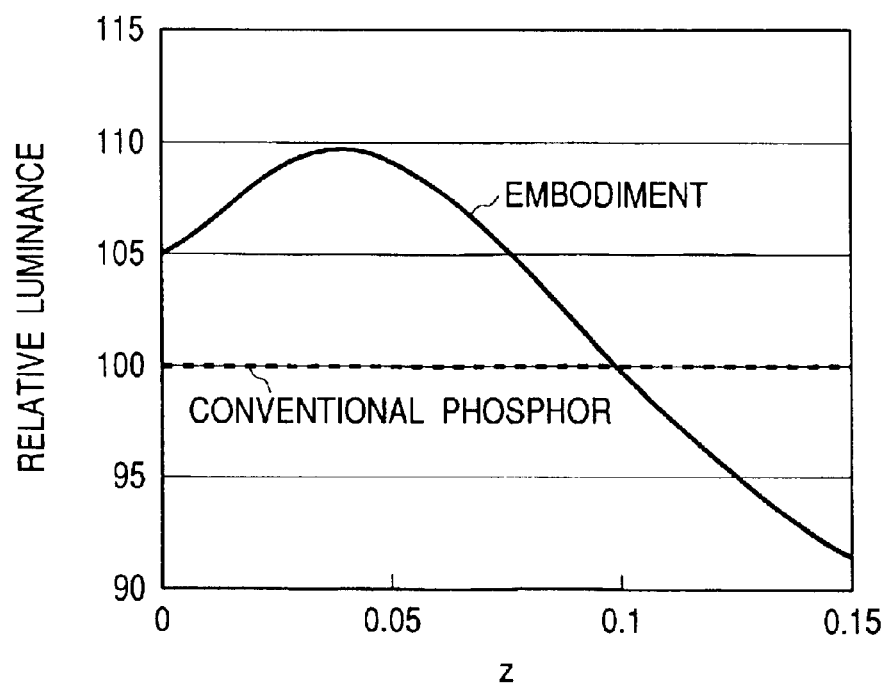
FIG. 4 shows a characteristic curve representing Gd concentration (x) versus relative luminance regarding the phosphors of the first embodiment of the invention.

FIG. 4 shows how the relative luminance of light emission by the phosphor samples of the invention, measured when excited by electron beams of current density of 10 μA/cm², changed as the value of z was varied from 0 to 1 similarly, wherein the luminance of conventional phosphor samples is assumed to be 100 (assuming that x=0.07, a=0, and z=0 for the conventional ones). The graph plotted is for z=0.15 and less. As apparent from FIG. 4, the luminance of the phosphor samples of the invention is higher than that of conventional ones in the range of $0<z\leq0.1$. Especially, around z=0.05, it is shown that luminance increased about 10% by the invention.

The measurements of other phosphor samples with different proportions of the components, wherein the value of x varies in the range of $0.03\leq x\leq0.15$ and the value of a varies in the range of $0\leq a\leq1$, showed the same results as shown in FIG. 4 of Embodiment 1 when the value of z was varied similarly.

The luminance of the phosphor samples of the invention was measured when excited by electron beams of current density of 10 $\mu$A/cm$^2$ as the value of x was varied from 0 to 0.5 with z=0.05 and a=0.05 and compared with the luminance of the conventional ones (assuming that x=0.07, a=0, and z=0 for the conventional ones). The luminance of the phosphor samples of the invention higher than that of the conventional ones was shown in the range of $0.5<x\leq0.15$.

The measurements of other phosphor samples with different proportions of the components, wherein the value of a varies in the range of $0\leq a\leq1$ and the value of z varies in the range of $0\leq z\leq1$, showed the same results as noted above for Embodiment 1 when the value of x was varied similarly.

Through synthesis by replacing a phosphor component with Gd as described above and, at the same time, adding more SiO$_2$ in terms of stoichiometric ratio, phosphors of the present invention showing higher luminance of light emission with less luminance degradation can be obtained.

<Embodiment 2>

We prepared phosphors having another composition in accordance with the present invention in a method as will be described below and evaluated the properties thereof.

As materials, (Y, Tb)$_2$O$_3$, SiO$_2$, and a Gd oxide were used. Alternatively, (Y, Tb, Sc)$_2$O$_3$ and SiO$_2$ were used. These materials of predetermined quantities were well mixed. The resultant mixture was put in an alumina crucible. After shutting the lid of the crucible, the mixture was burned for two hours in a reducing atmosphere at 1550° C. The solid resulting from the burning was crashed and broken into phosphor powders with a particle diameter of about 6 $\mu$m.

In this method, phosphors having composition expressed by chemical formula $\{(Y_{1-y}Sc_y)_{1-x}Tb_x\}_2 (SiO_2)_{1+a}O_3$ were prepared, wherein the composition was altered by varying the value of x in the range of $0.03\leq x\leq0.15$, the value of y in the range of $0<y\leq1$, and the value of a in the range of $0<a\leq1$. Thus, phosphor samples of different proportions of components were prepared. Conventional phosphor samples for which x=0.07, z=0, and a=0 were also prepared for comparison with the phosphor samples of the present invention. In conventional phosphors for practical use, generally, x= about 0.07.

The luminance and the factor of luminance degradation of the thus synthesized phosphor samples were measured in the same method as described in Embodiment 1.

Figure 5:
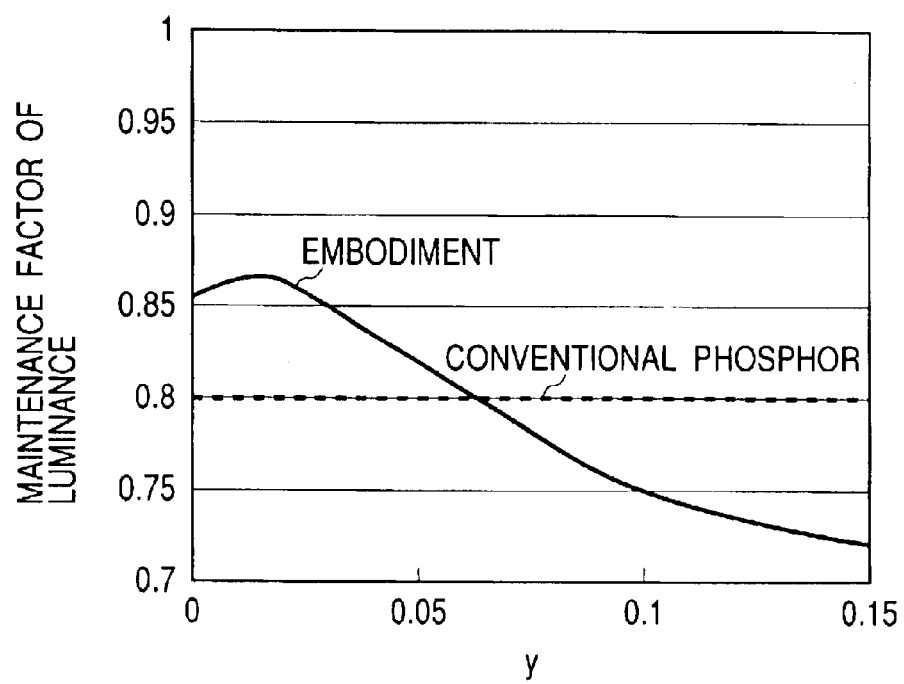
FIG. 5 shows a characteristic curve representing Sc concentration (y) versus the maintenance factor of luminance regarding phosphors according to a second embodiment of the present invention.

FIG. 5 shows how the maintenance factor of luminance of the phosphor samples of the invention after the accelerated degradation test, measured by the above-described method, changed as the value of y was varied from 0 to 0.15 with x=0.07 and a=0.05. The same factor of conventional phosphor samples is also plotted (assuming that x=0.07, a=0, and z=0 for the conventional ones). As apparent from FIG. 5, the maintenance factor of luminance of the phosphor samples of the invention is higher than that of conventional ones in the range of $0<y\leq0.07$.

The measurements of other phosphor samples with different proportions of the components, wherein the value of x varies in the range of $0.03\leq x\leq0.15$ and the value of a varies in the range of $0<a\leq1$, showed the same results as shown in FIG. 5 of Embodiment 2 when the value of y was varied similarly.

Figure 6:
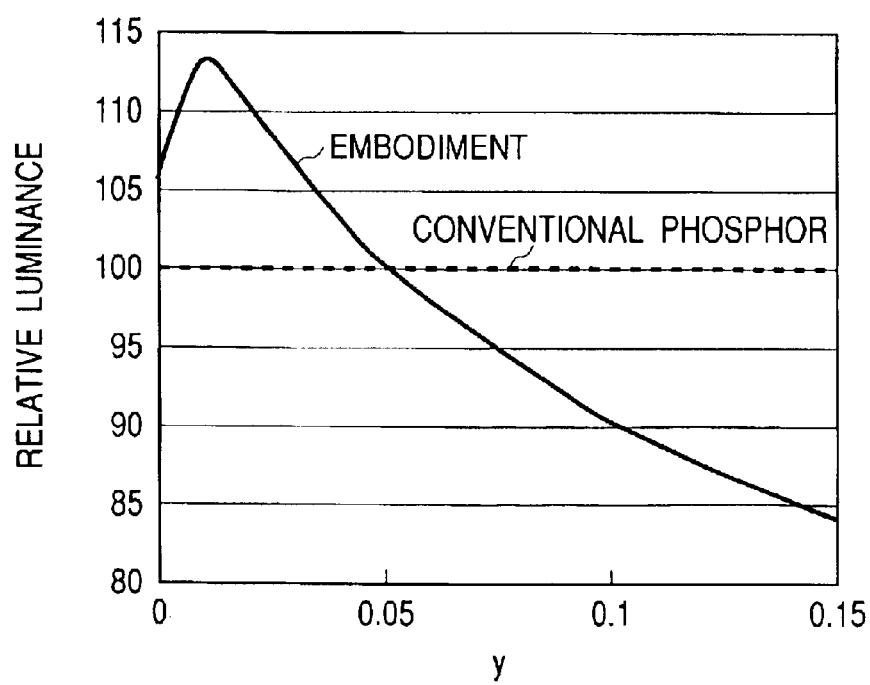
FIG. 6 shows a characteristic curve representing Sc concentration (y) versus relative luminance regarding the phosphors of the second embodiment of the present invention.

FIG. 6 shows how the relative luminance of light emission by the phosphor samples of the invention, measured when excited by electron beams of current density of 10 $\mu$A/cm$^2$, changed as the value of y was varied from 0 to 0.15 similarly, wherein the luminance of conventional phosphor samples is assumed to be 100 (assuming that x=0.07, a=0, and z=0 for the conventional ones). As apparent from FIG. 6, the luminance of the phosphor samples of the invention is higher than that of conventional ones in the range of $0<y\leq0.05$.

The measurements of other phosphor samples with different proportions of the components, wherein the value of x varies in the range of $0.03\leq x\leq0.15$ and the value of a varies in the range of $0<a\leq1$, showed the same results as shown in FIG. 6 of Embodiment 2 when the value of y was varied similarly.

Through synthesis by replacing a phosphor component with Sc as described above and, at the same time, adding more SiO$_2$ in terms of stoichiometric ratio, phosphors of the present invention showing higher luminance of light emission with less luminance degradation can be obtained.

<Embodiment 3>

We prepared phosphors having another composition in accordance with the present invention in a method as will be described below and evaluated the properties thereof.

Instead of Sc used in Embodiment 2, each one of the elements In, La, Lu, Yb, and Ce was used to replace a phosphor component. That is, (Y, Tb)$_2$O$_3$, SiO$_2$, and an oxide of at least one rare-earth element selected from a group comprising In, La, Lu, Yb, and Ce were used as materials.

Alternatively, (Y, Tb, M)$_2$O$_3$ and SiO$_2$ were used, where M is at least one rare-earth element selected from a group comprising In, La, Lu, Yb, and Ce.

These materials of predetermined quantities were well mixed. The resultant mixture was put in an alumina crucible. After shutting the lid of the crucible, the mixture was burned for two hours at 1600° C. The solid resulting from the burning was crashed and broken into phosphor powders with a particle diameter of about 6 $\mu$m.

In this method, phosphors having composition expressed by chemical formula $\{(Y_{1-y}M_y)_{1-x}Tb_x\}_2 (SiO_2)_{1+a}O_3$ were prepared, wherein the composition was altered by varying the value of x in the range of $0.03\leq x\leq0.15$, the value of y in the range of $0<y\leq0.15$, and the value of a in the range of $0<a\leq1$. Thus, phosphor samples of different proportions of components were prepared.

Conventional phosphor samples for which x=0.07, z=0, and a=0 were also prepared for comparison with the phosphor samples of the present invention. In conventional phosphors for practical use, generally, x= about 0.07.

The luminance and the factor of luminance degradation of the thus synthesized phosphor samples were measured in the same method as described in Embodiment 1. The results of the measurements showed that the luminance and the maintenance factor of luminance of the phosphor samples of the invention are higher than those of the conventional ones in the range of $0<y\leq0.1$.

The measurements of other phosphor samples with different proportions of the components, wherein the value of x varies in the range of $0.03\leq x\leq0.15$ and the value of a varies in the range of $0<a\leq1$, showed the same results as noted above for Embodiment 3 when the value of y was varied similarly.

Through synthesis by replacing a phosphor component with any of the elements In, La, Lu, Yb, and Ce as described above and, at the same time, adding more $SiO_2$ in terms of stoichiometric ratio, phosphors of the present invention showing higher luminance of light emission with less luminance degradation can be obtained.

Furthermore, it is also possible to replace phosphor components with two or more of the above elements simultaneously, and this way of synthesis can produce the same effect.

<Embodiment 4>

We prepared phosphors having yet another composition in accordance with the present invention in a method as will be described below and evaluated the properties thereof.

Instead of Sc used in Embodiment 2, Eu was used to replace a phosphor component. That is, $(Y, Tb)_2O_3$, $SiO_2$, and an Eu oxide were used as materials. Alternatively, $(Y, Tb, Eu)_2O_3$ and $SiO_2$ were used. These materials of predetermined quantities were well mixed. The resultant mixture was put in an alumina crucible. After shutting the lid of the crucible, the mixture was burned for two hours in a reducing atmosphere at 1550° C. The solid resulting from the burning was crashed and broken into phosphor powders with a particle diameter of about 6 $\mu$m.

In this method, phosphors having composition expressed by chemical formula $\{(Y_{1-y}Eu_y)_{1-x}Tb_x\}_2 (SiO_2)_{1+a}O_3$ were prepared, wherein the composition was altered by varying the value of x in the range of $0.03 \leq x \leq 0.15$, the value of y in the range of $0<y\leq0.15$, and the value of a in the range of $0 \leq a \leq 1$. Thus, phosphor samples of different proportions of components were prepared.

Conventional phosphor samples for which x=0.07, z=0, and a=0 were also prepared for comparison with the phosphor samples of the present invention. In conventional phosphors for practical use, generally, x= about 0.07.

The luminance and the factor of luminance degradation of the thus synthesized phosphor samples were measured in the same method as described in Embodiment 1. The results of the measurements showed that the luminance and the maintenance factor of luminance of the phosphor samples of the invention are higher than those of the conventional ones in the range of $0<y\leq1\times10^{-3}$.

The measurements of other phosphor samples with different proportions of the components, wherein the value of x varies in the range of $0.03 \leq x \leq 0.15$ and the value of a varies in the range of $0<a\leq1$, showed the same results as noted above for Embodiment 4 when the value of y was varied similarly.

Through synthesis by replacing a part of Y with Eu as described above and, at the same time, adding more $SiO_2$ in terms of stoichiometric ratio, phosphors of the present invention showing higher luminance of light emission with less luminance degradation can be obtained.

<Embodiment 5>

We prepared phosphors having a further composition in accordance with the present invention in a method as will be described below and evaluated the properties thereof.

Instead of Sc used in Embodiment 2, each one of the elements Sm, Tm, Ho, Er, and Nd was used to replace a phosphor component. That is, $(Y, Tb)_2O_3$, $SiO_2$, and an oxide of at least one rare-earth element selected from a group comprising Sm, Tm, Ho, Er, and Nd were used as materials.

Alternatively, $(Y, Tb, M)_2O_3$ and $SiO_2$ were used, where M is at least one rare-earth element selected from a group comprising Sm, Tm, Ho, Er, and Nd.

These materials of predetermined quantities were well mixed. The resultant mixture was put in an alumina crucible. After shutting the lid of the crucible, the mixture was burned for two hours in a reducing atmosphere at 1550° C. The solid resulting from the burning was crashed and broken into phosphor powders with a particle diameter of about 6 $\mu$m.

In this method, phosphors having composition expressed by chemical formula $\{(Y_{1-y}M_y)_{1-x}Tb_x\}_2 (SiO_2)_{1+a}O_3$ were prepared, wherein the composition was altered by varying the value of x in the range of $0.03\leq x \leq 0.15$, the value of y in the range of $0<y\leq0.15$, and the value of a in the range of $0<a\leq1$. Thus, phosphor samples of different proportions of components were prepared.

Conventional phosphor samples for which x=0.07, z=0, and a=0 were also prepared for comparison with the phosphor samples of the present invention. In conventional phosphors for practical use, generally, x= about 0.07.

The luminance and the factor of luminance degradation of the thus synthesized phosphor samples were measured in the same method as described in Embodiment 1. The results of the measurements showed that the luminance and the maintenance factor of luminance of the phosphor samples of the invention are higher than those of the conventional ones in the range of $0<y\leq5\times10^{-3}$.

The measurements of other phosphor samples with different proportions of the components, wherein the value of x varies in the range of $0.03\leq x \leq 0.15$ and the value of a varies in the range of $0<a\leq1$, showed the same results as noted above for Embodiment 5 when the value of y was varied similarly.

Through synthesis by replacing a part of Y with at least one rare-earth element selected from a group comprising Sm, Tm, Ho, Er, and Nd as described above and, at the same time, adding more $SiO_2$ in terms of stoichiometric ratio, phosphors of the present invention showing higher luminance of light emission with less luminance degradation can be obtained.

<Embodiment 6>

We prepared phosphors having a still further composition in accordance with the present invention in a method as will be described below and evaluated the properties thereof.

A part of Y in the formula of the phosphor samples of Embodiment 1 was replaced with Gd and, at the same time, another part of Y was replaced with each one of the elements Sc, In, La, Lu, Yb, Ce, Eu, Sm, Tm, Ho, Er, and Nd. That is, $(Y, Tb)_2O_3$, $SiO_2$, a Gd oxide, and an oxide of at least one rare-earth element selected from a group comprising Sc, In, La, Lu, Yb, Ce, Eu, Sm, Tm, Ho, Er, and Nd were used as materials.

Alternatively, $(Y, Gd, Tb)_2O_3$, $SiO_2$, and an oxide of at least one rare-earth element selected from a group comprising Sc, In, La, Lu, Yb, Ce, Eu, Sm, Tm, Ho, Er, and Nd were used.

Alternatively, $(Y, Gd, Tb, M)_2O_3$ and $SiO_2$ were used, where M is at least one rare-earth element selected from a group comprising Sc, In, La, Lu, Yb, Ce, Eu, Sm, Tm, Ho, Er, and Nd.

These materials of predetermined quantities were well mixed. The resultant mixture was put in an alumina crucible. After shutting the lid of the crucible, the mixture was burned for two hours in a reducing atmosphere at 1550° C. The solid resulting from the burning was crashed and broken into phosphor powders with a particle diameter of about 6 $\mu$m.

In this method, phosphors having composition expressed by chemical formula $\{(Y_{1-y-z}M_yGd_z)_{1-x}Tb_x\}_2 (SiO_2)_{1+a}O_3$ were prepared, wherein the composition was altered by varying the proportions of the components. As a result, the phosphors with a higher maintenance factor of luminance than the same factor of the phosphors of Embodiment 1 wherein a part of Y was solely replaced with Gd were obtained.

Through synthesis by replacing a part of Y with Gd and another part of Y with any of the elements Sc, In, La, Lu, Yb, Ce, Eu, Sm, Tm, Ho, Er, and Nd as described above and, at the same time, adding more $SiO_2$ in terms of stoichiometric ratio, phosphors of the present invention showing higher luminance of light emission with less luminance degradation can be obtained.

Furthermore, it is also possible to assign two or more of the above elements to M and replace Y in part with the two or more elements together with Gd, and this way of synthesis can produce the same effect.

<Embodiment 7>

We prepared phosphors having yet another composition in accordance with the present invention in a method as will be described below and evaluated the properties thereof.

We prepared phosphors having the composition formulated in Embodiment 1 or 4, wherein Si was further replaced with Ge. That is, a Ge oxide as well as the phosphor components specified in Embodiments 1 or 4 was used as materials. These materials of predetermined quantities were well mixed. The resultant mixture was put in an alumina crucible. After shutting the lid of the crucible, the mixture was burned for two hours in a reducing atmosphere at 1550° C. The solid resulting from the burning was crashed and broken into phosphor powders with a particle diameter of about 6 μm.

In this method, phosphors having composition expressed by chemical formula $\{(Y_{1-y-z}M_yGd_z)_{1-x}Tb_x\}_2(Si_{1-b}Ge_bO_2)_{1+a}$ (where $0<b\leq1$) were prepared, wherein the composition was altered by varying the proportions of the components. As a result, the phosphors with higher luminance of light emission and a higher maintenance factor of luminance than those of the conventional ones were obtained.

By replacing Si with Ge as given in the above formula, phosphors of the present invention showing higher luminance of light emission with less luminance degradation can be obtained.

<Embodiment 8>

We made a 7-inch projection cathode-ray tube for green images having a layer of the phosphors of any type prepared in accordance with the present invention as a green phosphor layer for image display. Then, we made a projection-type TV imaging device including three cathode-ray tubes in combination: the projection cathode-ray tube for green images made, using the art of the invention; a projection cathode-ray tube for blue images; and a projection cathode-ray tube for red images.

Figure 7:
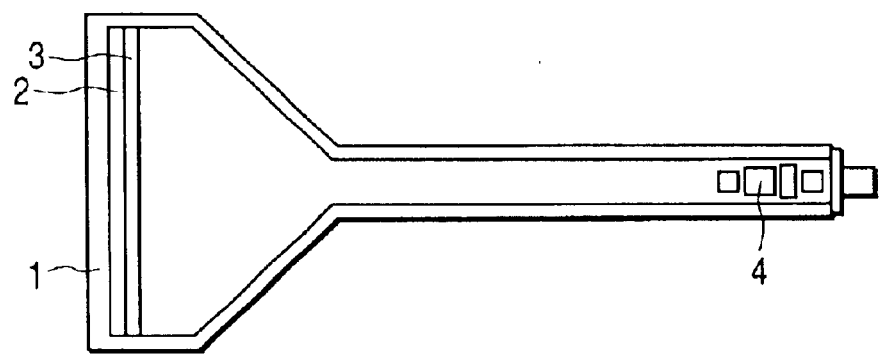
FIG. 7 is a schematic sectional view of a cathode-ray tube according to a further embodiment of the present invention.

FIG. 7 shows a schematic sectional view of the projection cathode-ray tube. In FIG. 7, the projection cathode-ray tube is equipped with an electron beam gun 4 at the neck end and has a phosphor layer 2 and a metal back 3 fit onto the inside of a face plate 1. The phosphor layer 2 of the projection cathode-ray tube consists of a monochrome layer.

The phosphor layer 2 was made by sedimentation of the phosphors prepared, according to one of the Embodiments 1 to 7 of the present invention, in a 7-inch valve. After filming and aluminum evaporation on the back surface, the electron beam gun and other parts were attached. The projection cathode-ray tube for green images was completed by degassing and sealing.

In the same method, other projection cathode-ray tubes for blue and red images were made, using phosphors available on the market.

Figure 8:
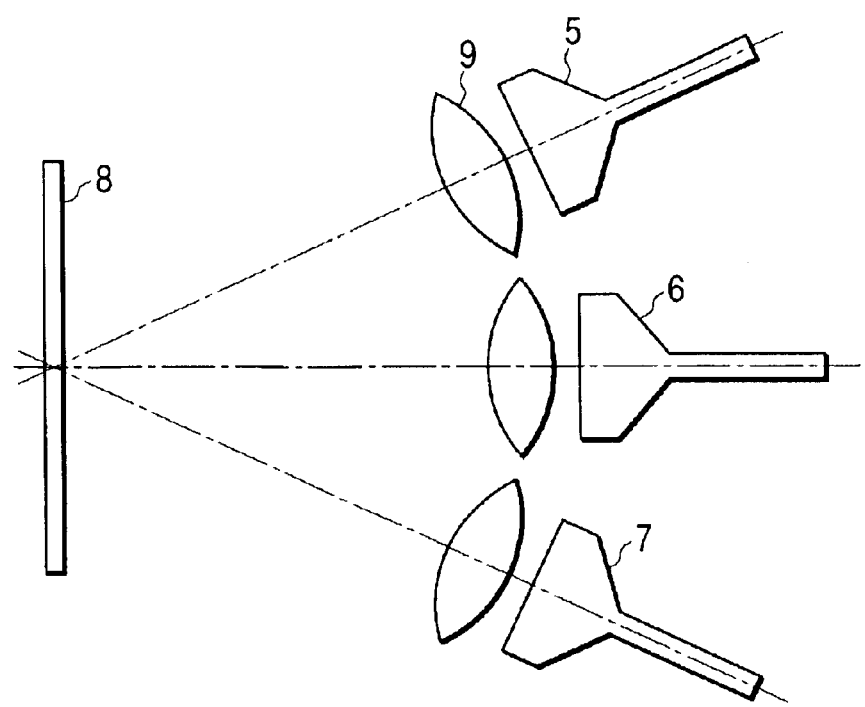
FIG. 8 is a schematic diagram representing the structure of a projection-type TV imaging device of the further embodiment of the invention.

FIG. 8 shows a schematic diagram of a projection-type TV imaging device in accordance with the present invention. In FIG. 8, reference numeral 5 denotes a cathode-ray tube for red images, 6 denotes a cathode-ray tube for green images of the present invention, 7 denotes a cathode-ray tube for blue images. A screen 8 is located at a distance from these tubes, facing the tubes. Lenses 9 are located between the screen and the projection cathode-ray tubes, aligned with the axis of each tube. A monochromatic image reproduced on the face plate of each projection cathode-ray tube is converged and enlarged through lenses and projected on the screen 8. Three colors reproduced by the tubes are combined into a color image on the screen.

Actually, the projection-type TV imaging device is composed of an image reproducing portion including a TV tuner, cathode-ray tube drive circuits, and image signal processing circuitry, an audio portion including speakers and amplifiers, operating mechanisms such as switches and volumes, and a cabinet for housing all parts, support frames, and a pedestal, besides the above cathode-ray tubes for each color images, screen, and lenses.

Measurements were made for the light emission properties of the projection-type TV imaging device of Embodiment 8 in methods as will be described below. Luminance was measured by a luminance meter from the point at a distance of 30 cm. Assuming the luminance of the current standard product of the same device in conventional use to be 100, the luminance measurements were represented in relative luminance.

The phosphor emission color was measured by a chromaticity meter from the point at a distance of 30 cm in the front of the face plate 1. Emission color comparison was made in terms of y values of chromaticity on the x-y chromaticity coordinates. All measurements for the above properties were made under the conditions that the phosphor layer in area of 102×76 mm is excited by being irradiated with 0.35-mA cathode rays.

The device property with regard to luminance degradation were evaluated by an accelerated degradation test. The phosphor layer in area of 102×76 mm was irradiated with 0.6-mA cathode rays continuously for 2000 hours. A ratio of the luminance measured after this test to the initial luminance was defined as a maintenance factor of luminance. The higher maintenance factor of luminance indicates the less luminance degradation.

The projection-type TV imaging device of Embodiment 8 showed a higher factor, that is, less luminance degradation than the conventional device of the same type. It also showed higher luminance than the conventional one. This proved that an imaging device of excellent green luminance with less degradation and producing good-quality images was obtained by the present invention.

As illustrated above, a cathode-ray tube and imaging device producing good-quality images can be provided, according to the present invention.

<Embodiment 9>

We made a 7-inch projection cathode-ray tube for green images having a layer of the phosphors of any type prepared in accordance with the present invention, mixed with $Zn_{(2-x)}SiO_4:Mn_x$ phosphors, as a green phosphor layer for image display. Then, we made a projection-type TV imaging device including the projection cathode-ray tube for green images made, using the art of the invention, a projection cathode-ray tube for blue images, and a projection cathode-ray tube for red images in combination. The device configuration and the method of measurement for the device properties are the same as described in Embodiment 8.

As the ratio in weight of the $Zn_{(2-x)}SiO_4:Mn_x$ phosphors to the phosphors of the invention in the above phosphor mixture layer was varied from 0 to 1, the y value of chromaticity on the CIE chromaticity coordinates and relative luminance were measured.

In green phosphors, the greater the y value of chromaticity, the better will be the color reproduction quality. Thus, better images are obtained.

It is found that, as the ratio in weight of the $Zn_{(2-x)}SiO_4:Mn_x$ phosphors increases, the y value of chromaticity rises, indicating better color reproduction quality. On the other hand, as the ratio in weight of the $Zn_{(2-x)}SiO_4:Mn_x$ phosphors increases, the luminance decreases. A higher ratio in weight of the $Zn_{(2-x)}SiO_4:Mn_x$ phosphors is preferred in view of color reproduction quality. However, in order to sufficient luminance for practical use, this ratio should be 0.4 or less. By using the phosphor mixture of the phosphors of the invention and the $Zn_{(2-x)}SiO_4:Mn_x$ phosphors at a ratio of 1:0.4 or less, an imaging device of excellent properties can be provided.

We made cathode-ray tubes using the phosphors of the invention mixed with $Zn_2SiO_4:Mn$ phosphors, $LaOCl:Tb$ phosphors, or $InBO_3:Tb$ phosphors instead of the $Zn_{(2-x)}SiO_4:Mn_x$ phosphors. As a result, the same results as described above were obtained. Phosphors to be mixed with the phosphors of the invention are not limited to those mentioned above. By using other phosphors capable of increasing the y value of chromaticity, the same results would be obtained.

<Embodiment 10>

We made a 7-inch projection cathode-ray tube for green images having a layer of the phosphors of any type prepared in accordance with the present invention, mixed with $Y_3(Al, Ga)_5O_{12}:Tb$ phosphors, as a green phosphor layer for image display. Then, we made a projection-type TV imaging device including the projection cathode-ray tube for green images made, using the art of the invention, a projection cathode-ray tube for blue images, and a projection cathode-ray tube for red images in combination. The device configuration and the method of measurement for the device properties are the same as described in Embodiment 8.

As the ratio in weight of the $Y_3(Al, Ga)_5O_{12}:Tb$ phosphors to the phosphors of the invention in the above phosphor mixture layer was varied from 0 to 1, the y value of chromaticity, relative luminance, and a factor of reducing luminance degradation were measured. As a result, when the ratio in weight of the $Y_3(Al, Ga)_5O_{12}:Tb$ phosphors increases, the relative luminance and the factor of reducing luminance degradation were enhanced, but the y value of chromaticity decreased. The value of chromaticity sufficient for practical use can be obtained when the ratio in weight of the $Y_3(Al, Ga)_5O_{12}:Tb$ phosphors is 0.6 or less. By using the phosphor mixture of the phosphors of the invention and the $Y_3(Al, Ga)_5O_{12}:Tb$ phosphors at a ratio of 1:0.6 or less, an imaging device of excellent properties can be provided.

Phosphors to be mixed with the phosphors of the invention are not limited to those mentioned above. By using other phosphors capable of enhancing the luminance and the factor of reducing luminance degradation, the same results would be obtained.

<Embodiment 11>

Figure 9:
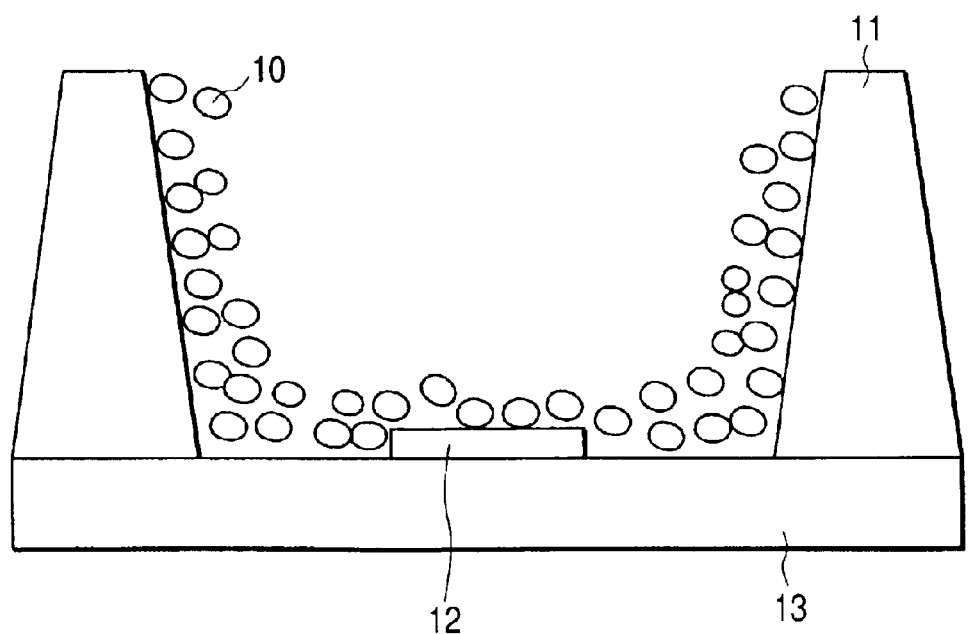
FIG. 9 is a schematic view depicting the cell structure of a plasma display panel according a still further embodiment of the invention.

We applied a phosphor layer comprising the phosphors of any type prepared in accordance with the invention to a plasma display panel (PDP). FIG. 9 is a sectional view schematically depicting the cell structure of a plasma display panel. FIG. 10 shows the structure of the plasma display panel when disassembled.

Figure 10A:
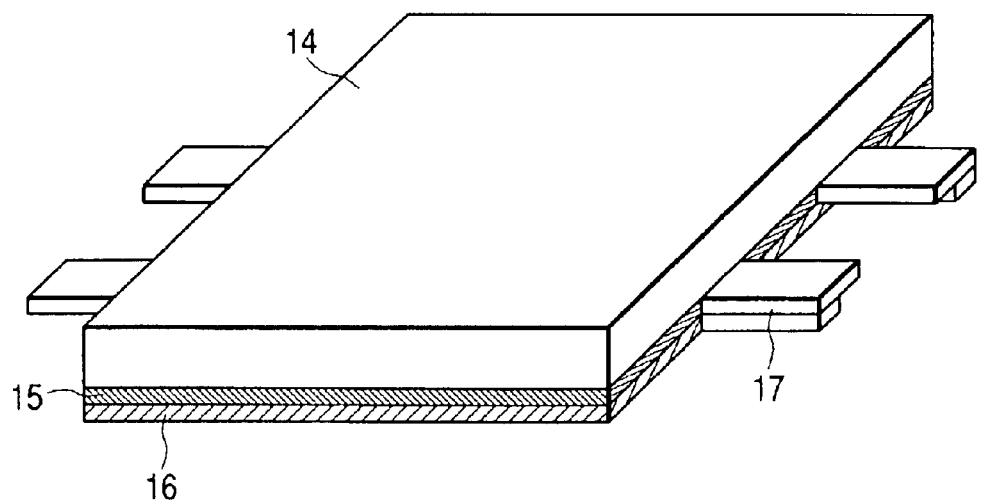
FIG. 10 shows the structure of the plasma display panel of the still further embodiment of the invention.
Figure 10B:
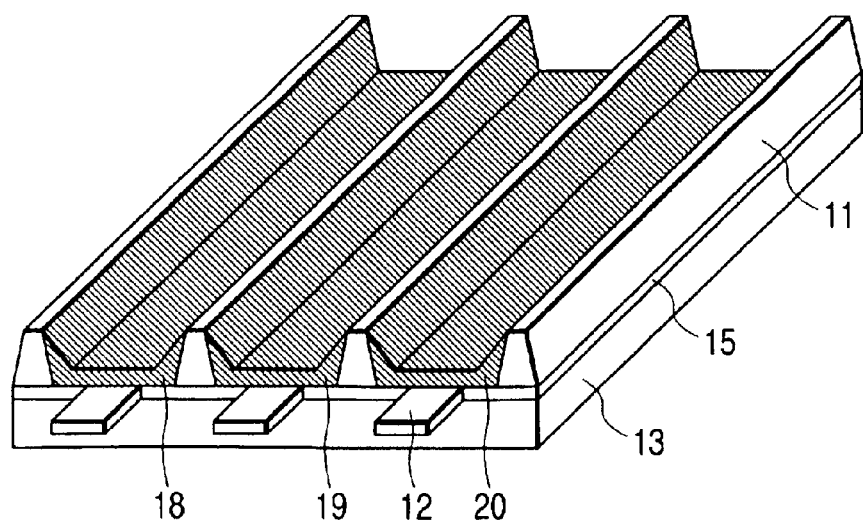

FIG. 10(a) depicts the front substrate and FIG. 10(b) depicts the back substrate. In FIG. 10, reference numeral 11 denotes a separating wall, 12 denotes an address electrode, 13 denotes back substrate glass, 14 denotes front substrate glass, 15 denotes a dielectric layer, 16 denotes a protect layer (MgO), 17 denotes a sustain electrode, 18 denotes a green emitting phosphor layer in accordance with the invention, 19 denotes a read emitting phosphor layer, and 20 denotes a blue emitting phosphor layer.

The PDP is constructed by putting the front substrate of FIG. 10(a) and the back substrate of FIG. 10(b) together and sealed to be airtight. The space above the stripe-grooved phosphor layers (provided as discharging space) is filled with discharging gas such as rare gas (inert gas).

The thus configured PDP according to the invention had higher luminance than the conventional PDP with less luminance degradation and produced better-quality images.

<Embodiment 12>

Figure 11:
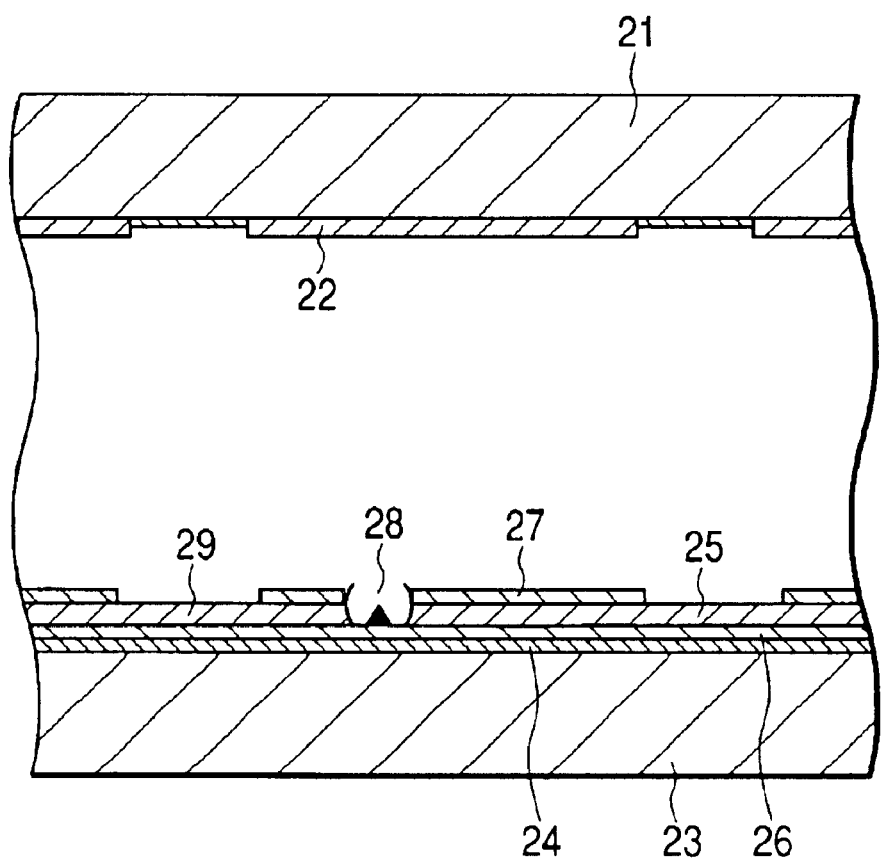
FIG. 11 is a view depicting the structure of a field-emitter display according to yet another embodiment of the invention.

We applied a phosphor layer comprising the phosphors of any type prepared in accordance with the invention to a field-emitter display (FED) that uses low-energy electron beams for exciting the phosphors. FIG. 11 is a sectional view depicting the cell structure of a field-emitter display. In FIG. 11, reference numeral 21 denotes a face plate, 22 denotes a phosphor layer, 23 denotes a rear plate, 24 denotes a cathode, 25 denotes a resistance layer, 26 denotes an insulation layer, 27 denotes a gate, 28 denotes coned metal, and 29 denotes a field emitting cathode.

In this way, the field-emitter display panel of higher luminance than the conventional FED with less luminance degradation and producing better-quality images can be made.

As explained hereinbefore, the object we intended could be attained by the present invention. According to the invention, phosphors that emit light of higher luminance with less luminance degradation and are suitable for high-quality image display and imaging devices producing high-quality images can be obtained.

What is claimed is:

1. A phosphor consisting of a composition represented by chemical formula:

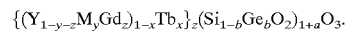

$\{(Y_{1-y-z}M_yGd_z)_{1-x}Tb_x\}_z(Si_{1-b}Ge_bO_2)_{1+a}O_3$.

wherein values of x, y, z, a, and b are assigned, subject to $0<x\leq0.5$, $0\leq y\leq1$, $0\leq z\leq1$, $0\leq y+z\leq1$, $0<a\leq1$, and $0\leq b\leq1$, and M is at least one element selected from a group consisting of Sc, In, La, Lu, Yb, Ce, Eu, Sm, Tm, Ho, Er, and Nd.

2. A phosphor according to claim 1, wherein, in said chemical formula, the value of z is assigned, subject to $0<z\leq0.1$.

3. A phosphor according to claim 1, wherein, in said chemical formula, the value of a is assigned, subject to $0<a\leq0.4$.

4. A phosphor according to claim 1, wherein, in said chemical formula, M is Sc and the value of y is assigned, subject to $0<y\leq0.07$.

5. A phosphor according to claim 1, wherein, in said chemical formula, M is at least one element selected from a group consisting of In, La, Lu, Yb, and Ce and the value of y is assigned, subject to $0<y\leq0.12$.

6. A phosphor according to claim 1, wherein, in said chemical formula, M is Eu and the value of y is assigned, subject to $0<y\leq1\times10^{-3}$.

7. A phosphor according to claim 1, wherein, in said chemical formula, M is at least one element selected from a group consisting of Sm, Tm, Ho, Er, and Nd and the value of y is assigned, subject to $0<y\leq5\times10^{-3}$.

8. A phosphor according to claim 1, wherein, in said chemical formula, the value of x is assigned, subject to $0.03 \leq x \leq 0.15$.

9. A phosphor consisting essentially of a mixture of the phosphor of claim 1 and at least one phosphor selected from a group consisting of $Y_3(Al, Ga)_5O_{12}:Tb$, $Zn_2SiO_4:Mn$, $LaOCl:Tb$, and $InBO_3:Tb$.

10. A phosphor consisting of a composition represented by chemical formula:

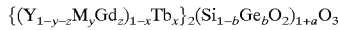

wherein values of x, y, z, a and b are assigned, subject to $0<x \leq 0.5$, $0 \leq y \leq 1$, $0 \leq z \leq 1$, $0 \leq y+z \leq 1$, $0<a \leq 0.3$, and $0 \leq b \leq 1$, and M is at least one element selected from a group consisting of Sc, In, La, Lu, Yb, Ce, Eu, Sm, Tm, Ho, Er, and Nd.

11. A cathode-ray tube comprising a phosphor layer on its face plate and a device which is adapted to apply electron beams to the phosphor layer, wherein said phosphor layer comprises a phosphor consisting of a composition represented by chemical formula:

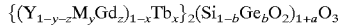

wherein values of x, y, z, a, and b are assigned, subject to $0<x \leq 0.5$, $0 \leq y \leq 1$, $0z \leq 1$, $0 \leq y+z \leq 1$, $0<a \leq 1$, and $0 \leq b \leq 1$, and M is at least one element selected from a group consisting of Sc, In, La, Lu, Yb, Ce, Eu, Sm, Tm, Ho, Er, and Nd.

12. An imaging device including the cathode ray tube comprising a phosphor layer on its face plate and a device which is adapted to apply electron beams to the phosphor layer, wherein said phosphor layer comprises a phosphor consisting of a composition represented by chemical formula:

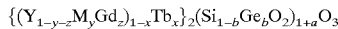

wherein values of x, y, z, a, and b are assigned, subject to $0<x \leq 0.5$, $0 \leq y \leq 1$, $0 \leq z \leq 1$, $0 \leq y+z \leq 1$, $0<a \leq 1$, and $0 \leq b \leq 1$, and M is at least one element selected from a group consisting of Sc, In, La, Lu, Yb, Ce, Eu, Sm, Tm, Ho, Er, and Nd.

13. A plasma display panel including a phosphor layer and a device which is adapted to apply ultraviolet rays to the phosphor layer, wherein said phosphor layer comprises a phosphor consisting of a composition represented by chemical formula:

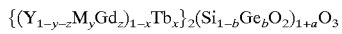

wherein values of x, y, z, a, and b are assigned, subject to $0<x \leq 0.5$, $0 \leq y \leq 1$, $0 \leq z \leq 1$, $0 \leq y+z \leq 1$, $0<a \leq 1$, and M is at least one element selected from a group consisting of Sc, In, La, Lu, Yb, Ce, Eu, Sm, Tm, Ho, Er, and Nd.

14. An imaging device including the plasma display panel comprising a phosphor layer and a device which is adapted to apply ultraviolet rays to the phosphor layer, wherein said phosphor layer comprises a phosphor consisting of a composition represented by chemical formula:

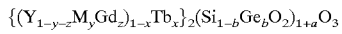

wherein values of x, y, z, a, and b are assigned, subject to $0<x \leq 0.5$, $0 \leq y \leq 1$, $0 \leq z \leq 1$, $0 \leq y+z \leq 1$, $0<a \leq 1$, and $0 \leq b \leq 1$, and M is at least one element selected from a group consisting of Sc, In, La, Lu, Yb, Ce, Eu, Sm, Tm, Ho, Er, and Nd.

15. A display panel, using low-energy electron beams, which includes a phosphor layer and a device which is adapted to apply low-energy electron beams to the phosphor layer, wherein said phosphor layer comprises a phosphor consisting of a composition represented by chemical formula:

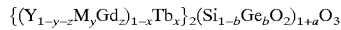

wherein values of x, y, z, a, and b are assigned, subject to $0<x \leq 0.5$, $0 \leq y \leq 1$, $0 \leq z \leq 1$, $0 \leq y+z \leq 1$, $0<a \leq 1$, and $0 \leq b \leq 1$, and M is at least one element selected from a group consisting of Sc, In, La, Lu, Yb, Ce, Eu, Sm, Tm, Ho, Er, and Nd.

16. An imaging device including a display panel, using low-energy electron beams, which includes a phosphor layer and a device which is adapted to apply low-energy electron beams to the phosphor layer, wherein said phosphor layer comprises a phosphor consisting of a composition represented by chemical formula:

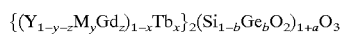

wherein values of x, y, z, a, and b are assigned, subject to $0<x \leq 0.5$, $0 \leq y \leq 1$, $0 \leq z \leq 1$, $0 \leq y+z \leq 1$, $0<a \leq 1$, and $0 \leq b \leq 1$, and M is at least one element selected from a group consisting of Sc, In, La, Lu, Yb, Ce, Eu, Sm, Tm, Ho, Er, and Nd.

17. A field-emitter display panel, using low-energy electron beams, which includes a phosphor layer and a device which is adapted to apply low-energy electron beams to the phosphor layer, wherein said phosphor layer comprises a phosphor consisting of a composition represented by chemical formula:

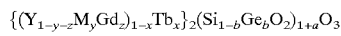

wherein values of x, y, z, a, and b are assigned, subject to $0<x \leq 0.5$, 023 $y \leq 1$, $0 \leq z \leq 1$, $0 \leq y+z \leq 1$, $0<a \leq 1$, and $0 \leq b \leq 1$, and M is at least one element selected from a group consisting of Sc, In, La, Lu, Yb, Ce, Eu, Sm, Tm, Ho, Er, and Nd.

18. A field-emitter display panel according to claim 17, wherein in said chemical formula, the value of a is assigned, subject to $0<a \leq 0.3$.

19. An imaging device including a field-emitter display panel, using low-energy electron beams, which includes a phosphor layer and a device which is adapted to apply low-energy electron beams to the phosphor layer, wherein said phosphor layer comprises a phosphor consisting a composition represented by chemical formula:

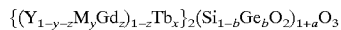

wherein values of x, y, z, a and b are assigned, subject to $0<x \leq 0.5$, $0 \leq y \leq 1$, $0 \leq z \leq 1$, $0 \leq y+z \leq 1$, $0<a \leq 0.3$, and $0 \leq b \leq 1$, and M is at least one element selected from a group consisting of Sc, In, La, Lu, Tb, Ce, Eu, Sm, Tm, Ho, Er, and Nd.

* * * * *